United States Patent
Yang

(10) Patent No.: US 8,887,244 B2
(45) Date of Patent: Nov. 11, 2014

(54) REGION ACCESS PLATFORM FOR PROVIDING A POSITIONING RESULT TO A POSITIONING CLIENT, A MOBILE POSITIONING METHOD OF THE REGION ACCESS PLATFORM, AND A MOBILE POSITIONING SYSTEM COMPRISING THE REGION ACCESS PLATFORM, A MOBILE POSITIONING CENTER AND A POSITION DETERMINING ENTITY

(75) Inventor: Kui Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/641,204

(22) PCT Filed: Feb. 1, 2011

(86) PCT No.: PCT/CN2011/070871
§ 371 (c)(1),
(2), (4) Date: Oct. 15, 2012

(87) PCT Pub. No.: WO2012/022138
PCT Pub. Date: Feb. 23, 2012

(65) Prior Publication Data
US 2013/0152170 A1   Jun. 13, 2013

(30) Foreign Application Priority Data
Aug. 16, 2010 (CN) .......................... 2010 1 0257540

(51) Int. Cl.
*H04L 29/06* (2006.01)
*H04W 4/20* (2009.01)
*H04W 12/02* (2009.01)
*H04W 12/06* (2009.01)

(52) U.S. Cl.
CPC ............... *H04L 63/08* (2013.01); *H04W 12/02* (2013.01); *H04W 4/20* (2013.01); *H04W 12/06* (2013.01)
USPC ............................................. 726/4; 455/410

(58) Field of Classification Search
CPC ........ H04W 4/24; H04W 12/00; H04W 12/06
USPC ............................................................ 726/4
See application file for complete search history.

(56) References Cited

U.S. PATENT DOCUMENTS 6,385,458 B1 * 5/2002 Papadimitriou et al. ... 455/456.2
7,359,716 B2 * 4/2008 Rowitch et al. ............ 455/456.3
(Continued)

FOREIGN PATENT DOCUMENTS

| CN | 1735267 A | 2/2006 |
|---|---|---|
| CN | 1741670 A | 3/2006 |
| CN | 101009912 A | 8/2007 |
| CN | 101917721 A | 12/2010 |

OTHER PUBLICATIONS

International Search Report for PCT/CN2011/070871 dated Apr. 29, 2011.

*Primary Examiner* — Hadi Armouche
*Assistant Examiner* — Bryan Wright
(74) *Attorney, Agent, or Firm* — Ling Wu; Stephen Yang; Ling and Yang Intellectual Property

(57) ABSTRACT

A region access platform is disclosed in the present invention. The region access platform is set to: receive a positioning request from a positioning client; authenticate the positioning client; and after the authentication is passed, obtain a positioning result locally or from a Mobile Positioning Center (MPC) and return the positioning result to the positioning client. A mobile positioning method is also disclosed in the present invention and includes: a region access platform receiving a positioning request from a positioning client, authenticating the positioning client, and after the authentication is passed, acquiring positioning result locally or from a MPC and returning the positioning result to the positioning client. A mobile positioning system is also disclosed in the present invention. The present invention can facilitate the management and maintenance and also facilitates the operator to carry out a service.

8 Claims, 3 Drawing Sheets

(56) References Cited

U.S. PATENT DOCUMENTS

| | | |
|---|---|---|
| 8,131,290 B2 * | 3/2012 | Lamba et al. .............. 455/433 |
| 8,224,360 B2 * | 7/2012 | Hwang et al. .............. 455/466 |
| 2005/0125493 A1 * | 6/2005 | Chaskar et al. .............. 709/203 |
| 2006/0009235 A1 * | 1/2006 | Sheynblat et al. ......... 455/456.1 |
| 2006/0172744 A1 * | 8/2006 | Tornkvist et al. .......... 455/456.1 |

* cited by examiner

US 8,887,244 B2

REGION ACCESS PLATFORM FOR PROVIDING A POSITIONING RESULT TO A POSITIONING CLIENT, A MOBILE POSITIONING METHOD OF THE REGION ACCESS PLATFORM, AND A MOBILE POSITIONING SYSTEM COMPRISING THE REGION ACCESS PLATFORM, A MOBILE POSITIONING CENTER AND A POSITION DETERMINING ENTITY

TECHNICAL FIELD

The present invention belongs to the field of mobile positioning in the secure user plane, and more especially, to a region access platform, a mobile positioning method and system.

BACKGROUND OF THE RELATED ART

The location based service (referred to LBS), also known as mobile location service or positioning service, refers to that the mobile network obtains geological location information of the mobile terminal, that is, the latitude and longitude coordinates, by using a specific positioning technology, and provides it to the mobile user, the communication system or a third party, and with a certain support of the electronic map information, provides the mobile user with call or non call services related to their locations.

The methods for positioning in the mobile communication network comprise the cell-based positioning, the traditional Global Positioning System (GPS) based positioning and the assisted global positioning system (AGPS) positioning. Wherein, the AGPS positioning is a positioning method that combines the GPS positioning and the mobile communications system, and it is widely used due to its rapid positioning speed and high positioning accuracy.

At present, it usually establishes one set of systems for the mobile positioning system, and the service providers (SPs) in the whole network can access to a mobile positioning center (MPC). The specific access system and method are shown in FIG. 1 and comprises:

the mobile Positioning Center (MPC) comprises a privacy authentication module, a base station database and a billing module;

the MPC is connected to the Position Determining Entity (PDE) and obtains the location information of the to-be-positioned terminal through the PDE;

the SP is connected to the MPC, sends the positioning request information to the MPC through the L1/Le interface, and the MPC obtains the location information of the to-be-positioned terminal according to the positioning request information through the PDE and returns the information to the SP through the L1/Le interface.

The advantage of this access method is that the mobile positioning service operator can rapidly carry out the service, reduce costs on the carrying out and maintenance, and facilitate the unified management.

However, when the positioning service has been carried out for a period of time, and the number of the accessed end-user and the SPs reaches a certain number, the amount of maintenance by the Mobile Positioning Center (MPC) increases, and the management is difficult. Moreover, the methods for various region operating units (province companies) to carry out the positioning service are not the same, so as the methods for billing and managing the end-users and the SPs, in addition, because the base station positioning information is often maintained and updated, maintaining one set of base station positioning information in the entire network is difficult to meet the operation needs.

SUMMARY OF THE INVENTION

The technical problem to be solved in the present invention is to provide a region access mobile positioning platform method and system.

In order to solve the aforementioned problem, the present invention provides a region access platform, and the region access platform is set to:

receive a positioning request from a positioning client, and authenticate the positioning client, if the authentication is passed, obtain a positioning result locally or from a mobile positioning center, and return the positioning result to the positioning client.

Said region access platform comprises: a region privacy authentication module, a region base station database module, and a region billing module, wherein:

said region privacy authentication module is set to: receive the positioning request from the positioning client and authenticate;

said region base station database module is set to: store location information of all base stations in a service area of the region access platform;

said region billing module is set to: locally bill said positioning request.

Said region access platform is set to authenticate said positioning client as follows: judge whether the positioning client has permission to access the region access platform and/or whether the positioning client has the permission to position a to-be-positioned terminal.

Said region access platform is set to obtain the positioning result locally or from the mobile positioning center as follows: when the positioning request is a coarse positioning request, obtaining the positioning result locally; when said positioning request is a high-precision positioning request, obtaining the positioning result from the mobile positioning center.

Said region access platform is also set to: send a notification message to the to-be-positioned terminal, query whether the positioning is allowed or not; after a positioning allowed acknowledgement message returned by the to-be-positioned terminal is received, obtain the positioning result, if no positioning allowed acknowledgement message returned by the positioned terminal is received, return a failure message to said positioning client.

In order to solve the aforementioned problem, the present invention also provides a mobile positioning method, the method comprising:

a region access platform receiving a positioning request from a positioning client, and authenticating the positioning client, when the authentication is passed, obtaining a positioning result locally or from a mobile positioning center, and returning the positioning result to the positioning client.

The step of authenticating the positioning client comprises:

judging whether the positioning client has permission to access the local region access platform or not and/or whether the positioning client has the permission to position a to-be-positioned terminal or not.

In the step of obtaining the positioning result locally or from the mobile positioning center, when the positioning request is a coarse positioning request, the region access platform obtaining said positioning result locally; when said positioning request is a high-precision positioning request, the region access platform obtaining the positioning result from said mobile positioning center.

Said step of said region access platform obtaining the positioning result from said mobile positioning center comprises:

the region access platform forwarding the positioning request to said mobile positioning center, said mobile positioning center obtaining the positioning result from a position determining entity, and returning the positioning result to the region access platform.

Before the step of the region access platform obtaining the positioning result, the method also comprises:

said region access platform sending a notification message to the to-be-positioned terminal and querying whether the positioning is allowed or not;

after receiving a positioning allowed acknowledgement message returned by the to-be-positioned terminal, said region access platform obtaining the positioning result; if said region access platform does not receive the positioning allowed acknowledgement message returned by the to-be-positioned terminal, returning a failure message to said positioning client.

In order to solve the aforementioned problem, the present invention also provides a mobile positioning system, comprising: a region access platform, a mobile positioning center and a position determining entity, wherein:

said region access platform is set to: receive a positioning request message from a positioning client and authenticate the positioning client, if the authentication is passed, obtain a positioning result locally or from the mobile positioning center, and return the positioning result to said positioning client;

said mobile positioning center is set to: when receiving a positioning request from the positioning client or the region access platform, obtain the positioning result from the position determining entity, and return the positioning result to the positioning client or said region access platform;

said position determining entity is set to: when receiving a positioning request from said mobile positioning center, return the positioning result to said mobile positioning center.

The present invention is applied to the system in which the mobile positioning center is accessed regionally, the existing MPC platform does not require to be specially modified and only be modified on the privacy configuration of the access platform. The region access positioning system provided in the present invention does not need to centralize all positioning services in the whole network into the mobile positioning center, so as to facilitate the management and maintenance, and each region access platform can carry out the positioning service with the local region characteristics based on the local operation needs, so as to facilitate the operators to carry out services.

PREFERRED EMBODIMENTS OF THE PRESENT INVENTION

In the following, the present invention will be described in further detail with combination of the accompanying drawings and the embodiments. It should be noted that without conflict, the embodiments in this application and the characteristics of the embodiments could be combined with each other randomly.

Figure 1:
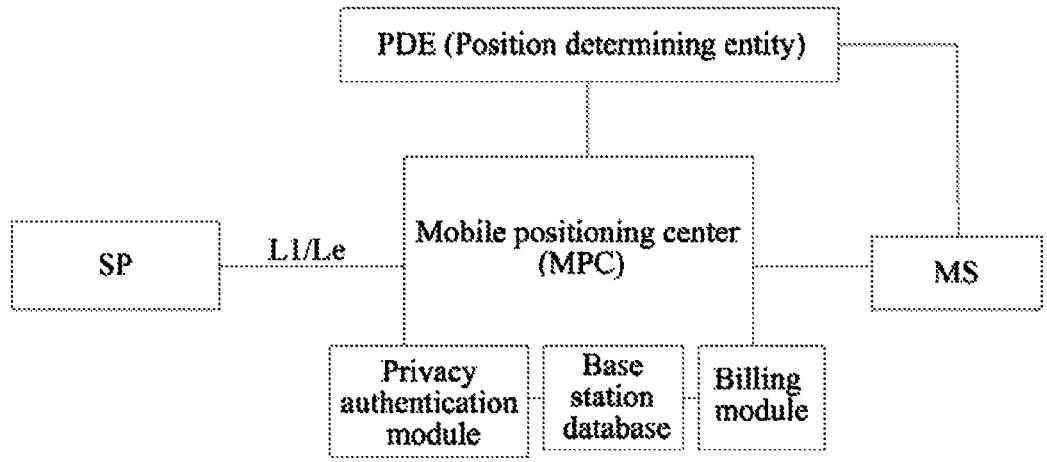
FIG. 1 is an architectural diagram of the mobile positioning system that is centrally deployed in nation.
Figure 2:
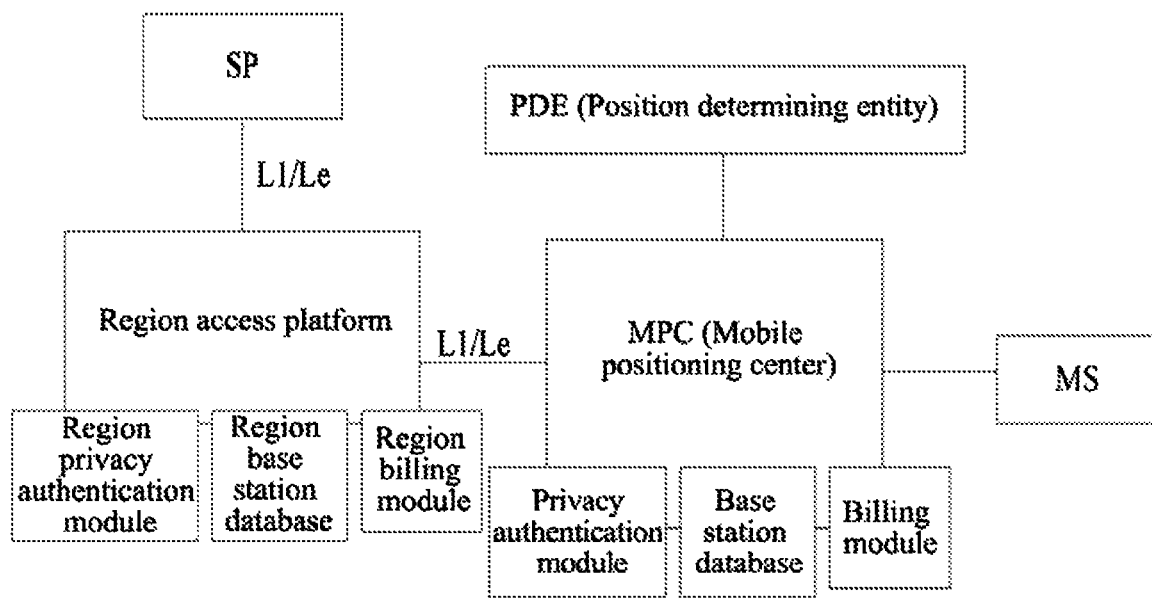
FIG. 2 is an architectural diagram of a region access mobile positioning system.

FIG. 2 is an architectural diagram of the region access mobile positioning system provided in the present invention, and compared with the architecture of the mobile positioning system centrally deployed in nation, a region access platform is added. Specifically, the region access mobile positioning system comprises: the PDE, the MPC and the region access platform, wherein:

said region access platform is set to: receive a positioning request message from the positioning client to authenticate, when the authentication is passed, obtain the positioning result from the local or the mobile positioning center, and return said positioning result to the positioning client;

said mobile positioning center is set to: when receiving a positioning request from the positioning client or the region access platform, obtain the positioning result from the position determining entity, and return the positioning result to the positioning client or said region access platform;

said position determining entity is set to: when receiving the positioning request from said mobile positioning center, return the positioning result to said mobile positioning center.

Wherein, the positioning client is a service provider (SP) or another third party entity that requests the positioning.

Furthermore, the region access platform comprises a region privacy authentication module, a region base station database module and a region billing module, wherein:

the region privacy authentication module is set to: receive the positioning request from the positioning client and authenticate; and the authentication content comprises: judging whether the positioning client has the permission to access the region access platform and/or whether the positioning client has the permission to position the to-be-positioned terminal or not.

The region base station database module comprises the location information of all the base stations in the service area of the local region access platform; in the coarse positioning request, it is able to directly obtain the location result by querying the local base station database system, and there is no need to obtain the result through the MPC;

the region billing module is set to perform the local billing for the positioning request.

Said region access platform is set to, when said positioning request is a coarse positioning request, obtain said positioning result locally; when said positioning request is a precise positioning request, obtain said positioning result from said mobile positioning center.

Said region access platform is also set to: send a notification message to the to-be-positioned terminal and query whether the positioning is allowed or not; after receiving a positioning allowed acknowledgement message returned from the positioned terminal, obtain the positioning result, otherwise, return a failure message to said positioning client.

Said region access platform also provides the operations of opening an account and closing an account for the positioning client and users that access to the service area, and inform the end users whether the functions such as the operation of allowing the positioning request through the SMS and so on are allowed or not. Each region access platform can carry out the positioning service with the local region characteristics based on the local operation needs.

The privacy authentication module, the base station database module and the billing module of the MPC mainly process the region access platform, and also process other positioning clients that direct access to the MPC without passing the region access platform.

The present invention provides a mobile positioning method, comprising:

the region access platform receiving a positioning request from the positioning client and authenticating the positioning client, when the authentication is passed, obtaining the positioning result locally or from a mobile positioning center, and returning the positioning result to the positioning client.

Said authentication comprises: judging whether the positioning client has the permission to access to the local region access platform or not and/or whether said positioning client has the permission to position the to-be-positioned terminal.

When the positioning request is a coarse positioning request, the region access platform obtains said positioning result locally; when said positioning request is a high-precision positioning request, the region access platform obtains the positioning result from said mobile positioning center.

The step of the region access platform obtaining the positioning result from said mobile positioning center comprises:

said region access platform forwarding said positioning request to said mobile positioning center, and said mobile positioning center obtaining the positioning result from the position determining entity, and returning the positioning result to the region access platform.

Before said region access platform obtains the positioning result, also performing:

said region access platform sending a notification messages to the to-be-positioned terminal to query whether the positioning is allowed or not;

after receiving a positioning allowed acknowledgement message returned by the to-be-positioned terminal, said region access platform obtaining the positioning result; otherwise, returning a failure message to said positioning client.

The present invention provides a mobile positioning method used in the mobile positioning system of the present invention, comprising the following steps:

step 1, the SP sends a positioning request message to the region access platform through the L1/Le interface;

step 2, the region access platform performs the authentication, if the authentication is passed, proceed to step 3, and if the authentication is not passed, proceed to step 5;

wherein, the authentication comprises: by the privacy database information, determining whether the SP has the permission to access the region access platform or not and whether the SP has the permission to position the to-be-positioned terminal;

step 3, determine the positioning type, if it is a coarse positioning, directly query the local base station database, and return the location information of the to-be-positioned terminal to the SP, and end; if it is a high-precision positioning, proceed to step 4;

step 4, if the positioning request is a high-precision positioning, the region access platform forwards the positioning request message to the MPC to process, the MPC returns the obtained location information of the to-be-positioned terminal to the region access platform, and the region access platform forwards the location information to the SP, and end;

step 5, if the authentication is not passed, return a failure message to the SP through the L1/Le interface.

Said SP needs to open an account in the region access platform.

The role of the region access platform in the MPC is a special SP, and the region access platform needs to open an account in the MPC. The positioning request message sent from the region access platform does not need to be authenticated in the MPC.

In the aforementioned method, if it is a special positioning method, the positioning request, such as the positioning request of the periodic positioning and the emergent positioning, can be processed in the region access platform and be converted into a common single positioning request and then sent to the MPC in turn, so as to simplify the MPC processing process. For example, the periodic positioning is decomposed into periodically sending a single request to the MPC to obtain the positioning result in the region access platform, thus simplifying the MPC processing process and saving the system resources of the MPC.

Figure 3:
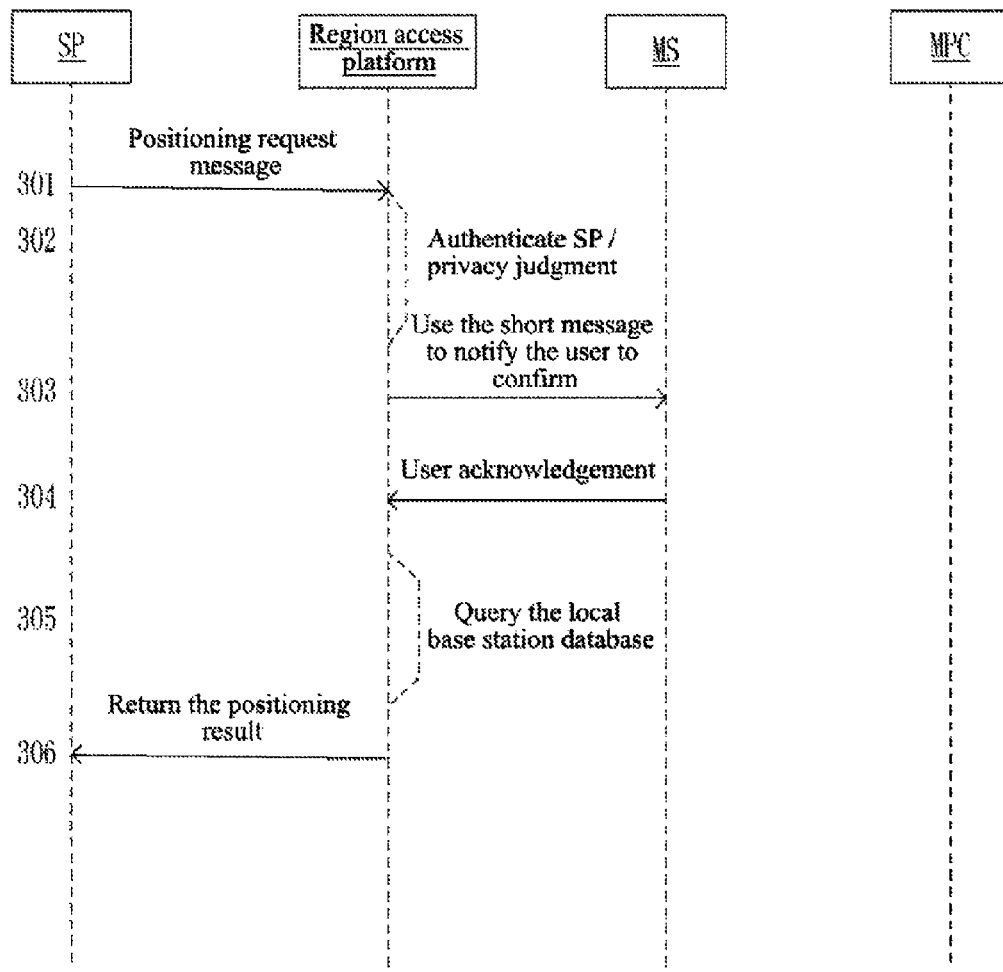
FIG. 3 is a flow chart of the process of deploying the coarse positioning according to the regions in accordance with an embodiment of the invention.

FIG. 3 is a diagram of an embodiment of coarse positioning in the present invention, in which the service provider (SP) initiates a positioning request to the region access platform, comprising the following steps:

301, the SP initiates a coarse positioning request to the region access platform through the L1/Le interface;

302, after the region access platform receives the coarse positioning request, it authenticates the SP according to the information carried in the request, and confirms whether the SP has the permission to position the to-be-positioned terminal or not, if the authentication is passed, proceed to step 303, and if the authentication is not passed, return a failure response to the SP;

303, the region access platform sends a positioning acknowledgement message to the terminal via the SMS, and notifies the terminal that the SP is now positioning the terminal and requests the terminal to confirm whether the positioning is allowed or not, and proceed to step 304;

304, after the to-be-positioned terminal receives the positioning acknowledgement message, it returns a response message according to its own situation, if the positioning is refused, the region access platform returns a failure message to the SP, and end this positioning, if the end-user allows to position, proceed to step 305;

305, the region access platform obtains the information of the cell in which the to-be-positioned terminal is located by querying the core network, and queries the local base station database system by the cell information to obtain the location information of the end-user;

306, after the region access platform obtains the location information of the end-user, it returns the location result to the SP through the L1/Le interface.

Figure 4:
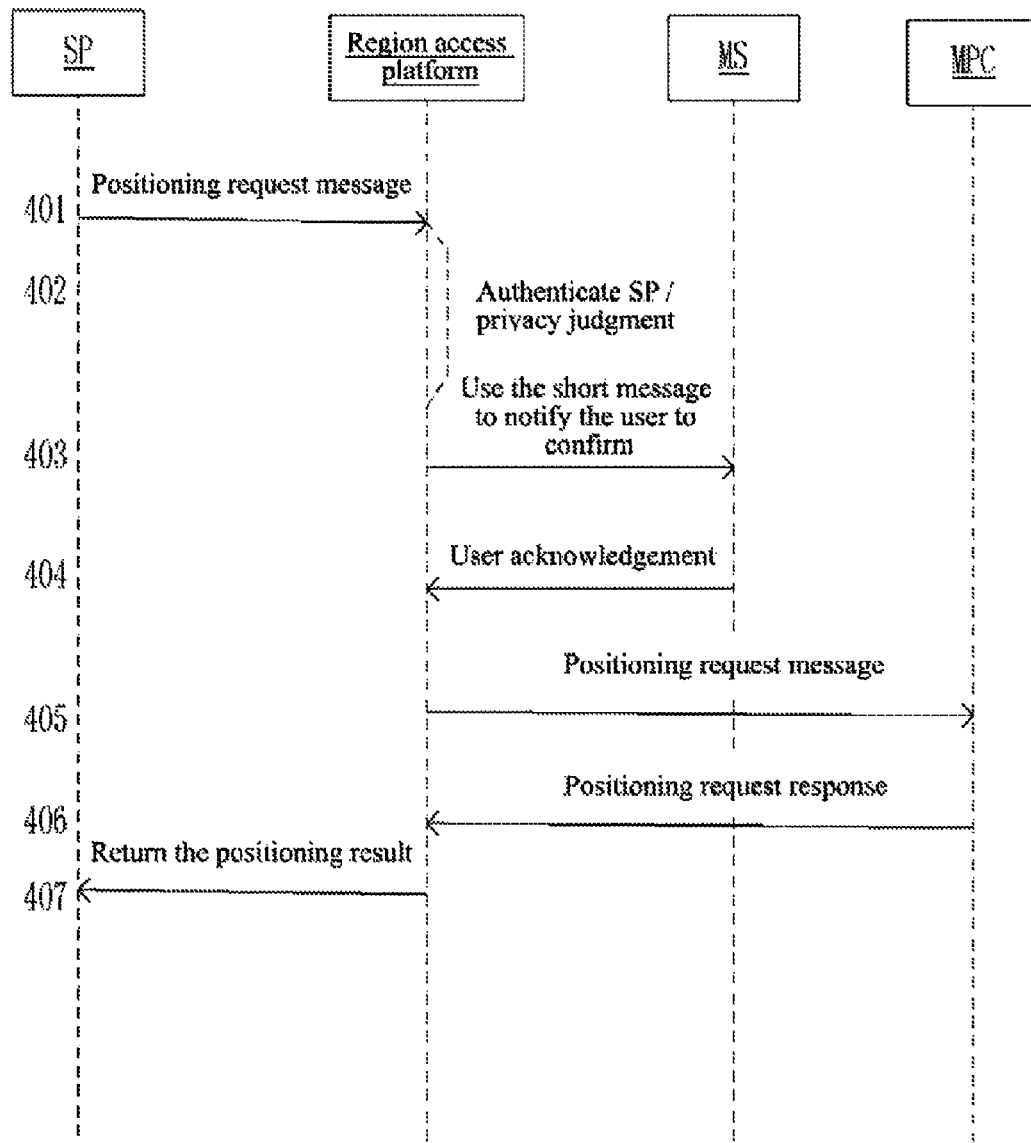
FIG. 4 is a flow chart of the process of deploying the high-precision positioning according to the regions in accordance with an embodiment of the invention.

FIG. 4 shows a diagram of an embodiment of high-precision positioning in the present invention, in which the service provider (SP) initiates an AGPS high-precision positioning request to the region access platform, comprising the following steps:

401, the SP initiates a high-precision positioning request to the region access platform through the L1/Le interface;

402, after the region access platform receives the high-precision positioning request, it authenticates the SP according to the information carried in the request, and confirms whether the SP has the permission to position the to-be-positioned terminal or not, if the authentication is passed, proceed to step 403, and if the authentication is not passed, return a failure response to the SP;

403, the region access platform sends a positioning acknowledgement message to the terminal via the SMS, and notifies the terminal that the SP is now positioning the terminal, and requests the terminal to confirm whether the positioning is allowed or not, and proceed to step 404;

404, after the to-be-positioned terminal receives a positioning acknowledgement message, it returns a response message according to its own situation, if the positioning is refused, the region access platform returns a failure message to the SP, and ends this positioning, if the end-user allows the positioning, proceed to step 405;

405, the region access platform forwards the received positioning request message to the MPC through the L1/Le interface, and the MPC obtains the high-precision location information of the end user through the PDE;

406, the MPC returns the high-precision location information of the end user to the region access platform;

407, after the region access platform obtains the high-precision location information of the end user, it returns the high-precision location information to the SP through the L1/Le interface.

The above description is only the preferred embodiments of the present invention and is not used to limit the present invention, and any changes, equivalent replacements and improvements made without departing from the spirit and principles of the present invention should be included in the protection scope of the present invention.

The person of ordinary skill in the art can understand that all or part of the steps in the aforementioned method can be completed by a program instructing the related hardware, and the program can be stored in a computer readable storage medium, such as a read-only memory, disk, or CD-ROM. Optionally, all or part of the steps in the aforementioned embodiments can also be achieved with one or more integrated circuits, and accordingly, each module/unit in the aforementioned embodiments can be implemented in the form of hardware or software functional modules. The present invention is not limited to any particular form of hardware and software combination.

INDUSTRIAL APPLICABILITY

The present invention is applied to the region access mobile positioning center system, the existing MPC platform does not require to be specially modified and only be modified on the privacy configuration of the access platform. The region access positioning system provided in the present invention does not need to centralize all positioning services in the whole network into the mobile positioning center, so as to facilitate the management and maintenance, and each region access platform can carry out the positioning service with the local region characteristics based on the local operation needs, so as to facilitate the operators to carry out services.

What is claimed is:

1. A region access platform, comprising:
a processor;
and a storage device storing computer executable instructions that when executed by the processor cause the processor to perform the steps of:
receiving a positioning request from a positioning client, and authenticating the positioning client, when the authentication is passed, determining the type of the positioning;
when the type of the positioning is a coarse positioning, obtaining a positioning result by querying a local base station database, wherein the local base station database comprises location information of all the base stations within the service area of the region access platform;
when the type of the positioning is a high-precision positioning, obtaining a positioning result from a mobile positioning center; and
returning the positioning result to the positioning client;
wherein, said storage device further stores computer executable instructions that when executed by the processor cause the processor to perform the steps of: sending a notification message to a to-be-positioned terminal, querying whether the positioning is allowed or not after a positioning allowed acknowledgement message returned by the to-be-positioned terminal is received, obtaining the positioning result, if no positioning allowed acknowledgement message returned by the positioned terminal is received, returning a failure message to said positioning client.

2. The region access platform of claim 1, wherein, said storage device further stores computer executable instructions that when executed by the processor cause the processor to perform the steps of:
receiving the positioning request from the positioning client and authenticating; and
locally billing said positioning request.

3. The region access platform of claim 1, wherein, said positioning client is authenticated by: judging whether the positioning client has permission to access the region access platform and/or whether the positioning client has the permission to position a to-be-positioned terminal.

4. A mobile positioning method, the method comprising:
a region access platform receiving a positioning request from a positioning client, and authenticating the positioning client, when the authentication is passed, the region access platform determining the type of the positioning;
when the type of the positioning is a coarse positioning, the region access platform obtaining a positioning result by querying a local base station database, wherein the local base station database comprises location information of all the base stations within the service area of the region access platform;
when the type of the positioning is a high-precision positioning, the region access platform obtaining a positioning result from a mobile positioning center; and
returning the positioning result to the positioning client;
wherein, before the step of the region access platform obtaining the positioning result, the method also comprises:
said region access platform sending a notification message to a to-be-positioned terminal and querying whether the positioning is allowed or not;
after receiving a positioning allowed acknowledgement message returned by the to-be-positioned terminal, said region access platform obtaining the positioning result;
if said region access platform does not receive the positioning allowed acknowledgement message returned by the to-be-positioned terminal, returning a failure message to said positioning client.

5. The method of claim 4, wherein, the step of authenticating the positioning client comprises:
judging whether the positioning client has permission to access the local region access platform or not and/or whether the positioning client has the permission to position a to-be-positioned terminal or not.

6. The method of claim 4, wherein, said step of said region access platform obtaining the positioning result from said mobile positioning center comprises:
the region access platform forwarding the positioning request to said mobile positioning center, said mobile positioning center obtaining the positioning result from a position determining entity, and returning the positioning result to the region access platform.

7. A mobile positioning system, comprising: a region access platform, a mobile positioning center and a position determining entity, wherein:

said region access platform comprises a processor and a storage device storing computer executable instructions that when executed by the processor cause the processor to perform the steps of: receiving a positioning request message from a positioning client and authenticating the positioning client, when the authentication is passed, determining the type of the positioning, when the type of the positioning is a coarse positioning, obtaining a positioning result by querying a local base station database, wherein the local base station database comprises location information of all the base stations within the service area of the region access platform, when the type of the positioning is a high-precision positioning, obtaining a positioning result from the mobile positioning center, and returning the positioning result to said positioning client;

said mobile positioning center comprises a processor and a storage device storing computer executable instructions that when executed by the processor cause the processor to perform the steps of: when receiving a positioning request from the positioning client or the region access platform, obtaining the positioning result from the position determining entity, and returning the positioning result to the positioning client or said region access platform;

said position determining entity comprises a processor and a storage device storing computer executable instructions that when executed by the processor cause the processor to perform the steps of: when receiving a positioning request from said mobile positioning center, returning the positioning result to said mobile positioning center;

wherein, in said region access platform, said storage device further stores computer executable instructions that when executed by the processor cause the processor to perform the steps of: sending a notification message to a to-be-positioned terminal, querying whether the positioning is allowed or not after a positioning allowed acknowledgement message returned by the to-be-positioned terminal is received, obtaining the positioning result, if no positioning allowed acknowledgement message returned by the positioned terminal is received, returning a failure message to said positioning client.

8. The region access platform of claim 2, wherein, said positioning client is authenticated by: judging whether the positioning client has permission to access the region access platform and/or whether the positioning client has the permission to position a to-be-positioned terminal.

* * * * *